(No Model.)
G. H. COPELAND.
CLOTHES LINE REEL.
No. 475,038. Patented May 17, 1892.
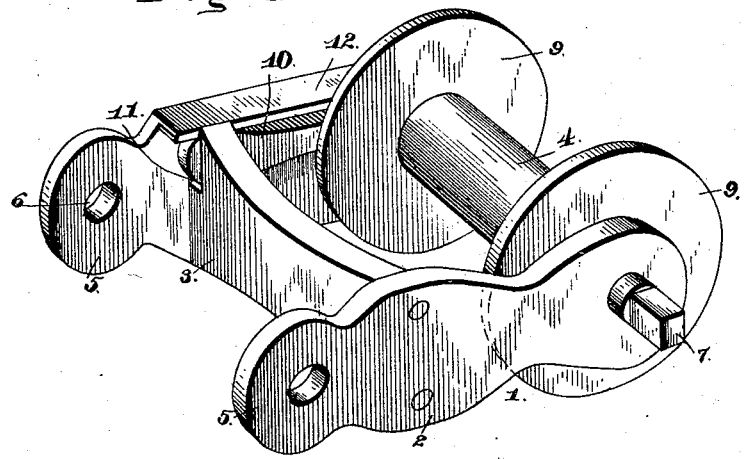
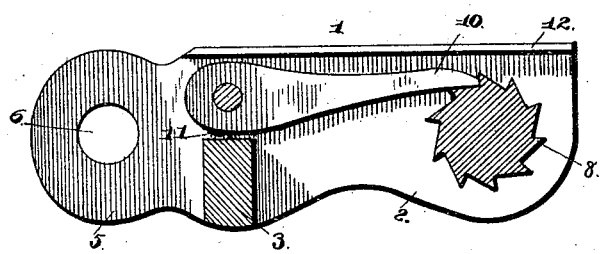
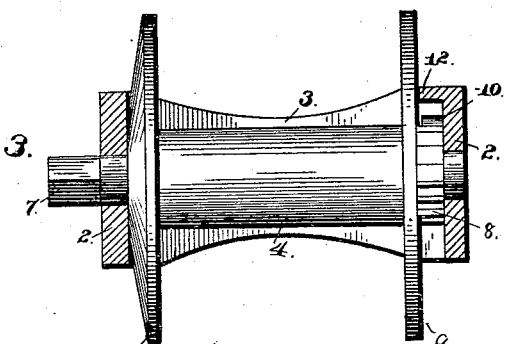
Witnesses
Chas. A. Ford.
N. H. Riley
Inventor
George H. Copeland.
By his Attorneys,
C. A. Snow & Co.

UNITED STATES PATENT OFFICE.

GEORGE H. COPELAND, OF RICH HILL, MISSOURI.

CLOTHES-LINE REEL.

SPECIFICATION forming part of Letters Patent No. 475,038, dated May 17, 1892.

Application filed January 28, 1892. Serial No. 419,562. (No model.)

*To all whom it may concern:*

Be it known that I, GEORGE H. COPELAND, a citizen of the United States, residing at Rich Hill, in the county of Bates and State of Missouri, have invented a new and useful Clothes-Line Reel, of which the following is a specification.

The invention relates to improvements in clothes-line reels.

The object of the present invention is to provide a simple and inexpensive clothes-line reel which will be adapted to hold a clothes-line and which may be readily attached to a supporting-post or the like and by which a clothes-line may be readily handled both in putting up and tightening the same and in taking in the line.

The invention consists in the construction and novel combination and arrangement of parts hereinafter fully described, illustrated in the accompanying drawings, and pointed out in the claim hereto appended.

In the drawings, Figure 1 is a perspective view of a clothes-line reel constructed in accordance with this invention. Fig. 2 is a longitudinal sectional view. Fig. 3 is a front view of the reel, the frame being in section.

Like numerals of reference indicate corresponding parts in all the figures.

1 designates a frame consisting of side bars 2 and an intermediate cross-bar 3 and adapted to be attached to a supporting-post or other place and having journaled in it a drum 4, on which a clothes-line may be wound to hold the same when not in use and to tighten the line when up for use. The rear ends 5 of the side bars project beyond the cross-bar 3, and are provided with perforations 6, through which may be passed a securing rope or wire to fasten the reel to a supporting-post or the like, and the front ends or outer ends of the side bars 2 are provided with bearing-openings, in which is journaled the shaft of the drum. One end of the shaft is squared at 7 to receive a crank-handle, and the drum is provided at the opposite end with ratchet-teeth 8, arranged on the outer face of one of the side flanges 9 of the drum and adapted to be engaged by a gravity-pawl 10, arranged on the inner face of the adjacent side bar and having its rear end pivoted in a recess 11 at one end of the cross-bar. The side 2, on which the gravity-pawl is arranged, is provided at its upper edge with an inwardly-extending longitudinal flange 12, which projects over the gravity-pawl and the ratchet-teeth and forms a partial casing to protect the parts from the weather. The flange is also adapted to support the gravity-pawl to prevent the same swinging outward from the frame when the reel is reversed in putting up a line. When it is desirable to put up the line by reversing the reel, the gravity-pawl drops out of engagement with the ratchet-teeth, and the drum is free to rotate to pay out the line, and after the line has been put up the reel is righted and by turning the drum the line may be tightened to any desired tension.

It will be seen that the clothes-line reel is simple and comparatively inexpensive in construction and is capable of enabling a line to be readily handled and properly adjusted.

What I claim is—

In a clothes-line reel, the combination of the frame comprising the cross-bar having one of its ends recessed, the side bars secured to the cross-bar and projecting rearwardly therefrom and having their rear ends perforated, one of the sides having at its upper edge a longitudinal flange projecting inward, a drum journaled between the front ends of the side bars and provided at one end with ratchet-teeth, and a gravity-pawl arranged on the side having the flange and having its rear end pivoted in the recess of the cross-bar and its front end arranged to engage the ratchet-teeth, substantially as described.

In testimony that I claim the foregoing as my own I have hereto affixed my signature in the presence of two witnesses.

GEORGE H. COPELAND.

Witnesses:
J. F. SMITH,
LARRIS CAIN.